United States Patent [19]

Yamamoto

[11] Patent Number: 4,593,238

[45] Date of Patent: Jun. 3, 1986

[54] METHOD AND APPARATUS FOR CONTROLLING TRAVEL OF AN AUTOMATIC GUIDED VEHICLE

[75] Inventor: Kenzo Yamamoto, Osaka, Japan

[73] Assignee: Tsubakimoto Chain Co., Osaka, Japan

[21] Appl. No.: 647,993

[22] Filed: Sep. 6, 1984

[30] Foreign Application Priority Data

Sep. 17, 1983 [JP] Japan .................................. 58-171736

[51] Int. Cl.$^4$ ............................................... G05D 1/00
[52] U.S. Cl. .................................... 318/587; 180/167; 180/169
[58] Field of Search ................ 318/587; 180/167, 168, 180/169

[56] References Cited

U.S. PATENT DOCUMENTS 3,738,443 6/1973 Kubo ................................. 318/587 X
4,247,896 1/1981 Schnaibel ......................... 318/587 X Primary Examiner—B. Dobeck
Attorney, Agent, or Firm—Darby & Darby

[57] ABSTRACT

An automatic guided vehicle travels for a predetermined distance by detecting the distance covered, and thereafter stops when the mark located at the desired stopping point is detected by at least one sensor. Obstacles on the route, and cumulative error therefore have very little influence on the vehicle's travel, so that accurate travel control is obtained.

4 Claims, 7 Drawing Figures

METHOD AND APPARATUS FOR CONTROLLING TRAVEL OF AN AUTOMATIC GUIDED VEHICLE

BACKGROUND OF THE INVENTION

1. Field of the Invention

The present invention relates to a method and an apparatus for controlling the travel of an automatic guided vehicle to make the automatic guided vehicle travel and stop at intended point.

2. Description of the Prior Art

Various methods have been proposed, and put to practical use, for causing an unmanned vehicle (automatic guided vehicle) to travel from place to place on a plant floor along a route composed of an optical reflective tape or the like, instead of a railed track. One typical known method of the type is illustrated in FIG. 1 by way of example. FIG. 1 is a schematic plan view showing a conventional method of controlling the travel of an automatic guided vehicle. As shown in FIG. 1, a route consists of a line of optical reflective tape R fixed on a floor surface in a loop-form pattern to connect between a start point 0 and a plurality of points A, B . . . in order. A plural of count marks CM, CM . . . composed of a similar reflective tape or the like are separately fixed on the floor at predetermined intervals along the route. An automatic guided vehicle 30, provided with sensors 31 and 32 for detecting reflective tape R as the route and count marks CM, CM . . . respectively, is allowed to run along the route by detecting the reflective tape R by sensor 31. Whilst, the sensor 32 counts the number of count marks CM, CM . . . passed by automatic guided vehicle 30; and each time such counted number reaches the number of count marks CM, CM . . . present over a distance from the start point 0 to each or any of the intended points A, B . . . , the automatic guided vehicle 30 is braked to selectively stop at each or any of the points A, B . . . .

Such control method has a difficulty in that if any obstacles resembling a count mark is present adjacent any point of the route or if any of the count mark CM is stained, some deviation may be caused to the numeric value of counting up to an intended point. Similarly, if an error is made in the counting of count marks CM, CM . . . because of some snaking or the like involved in the travel of the automatic guided vehicle 30 on the way to an intended point, the automatic guided vehicle 30 may stop at a point other than intended point. With errors accumulated, such deviation will naturally become larger as the distance of travel increases. In addition, execution of laying the count-mark requires considerable labor because a large number of count marks are involved.

OBJECT OF THE INVENTION

A first object of the present invention is to provide a method and apparatus for controlling travel of an automatic guided vehicle which realizes accurate arrival and stopping of the automatic guided vehicle at any intended point.

A second object of the invention is to provide a method and apparatus for controlling travel of an automatic guided vehicle which can limit deviations of stop point due to reference-mark detection errors to a minimum possible extent.

A third object of the invention is to provide a method and apparauts for controlling travel of an automatic guided vehicle which realizes accurate stopping of the automatic guided vehicle at any intended point without cumulative error, even when the automatic guided vehicle travels for long distance.

A fourth object of the invention is to provide a method and apparatus for controlling travel of an automatic guided vehicle, which is not influenced by any obstacles on the route, or any stain or damage caused to reference marks for control.

The above and further objects and features of the invention will more fully be apparent from the following detailed description with accompanying drawings.

DETAILED DESCRIPTION OF THE INVENTION

Figure 1:
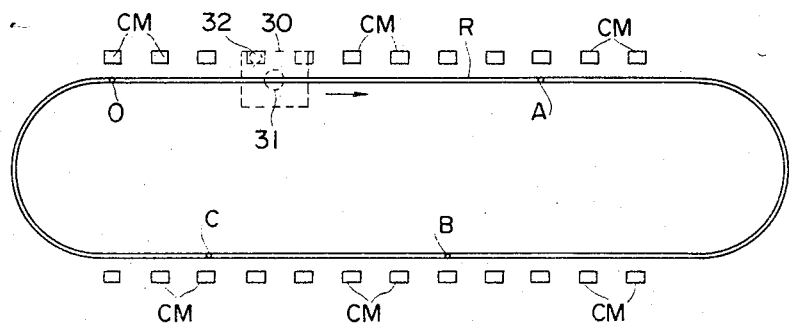
FIG. 1 is a schematic plan view illustrating a conventional method of controlling travel of an automatic guided vehicle.
Figure 2:
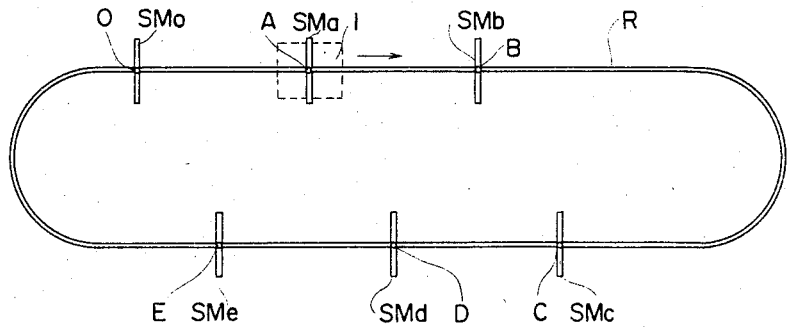
FIG. 2 is a schematic plan view illustrating one mode of carrying out the method according to the invention.

The method and apparatus of the invention will now be described in detail with reference to the accompanying drawings which, except FIG. 1, illustrate one mode of practicing the invention. FIG. 2 is a schematic plan view showing a ground arrangement employed in carrying out the invention. In the figure, R designates an optical reflective tape which forms a route; SMa, SMb . . . SMe designate station marks disposed at predetermined points or stations A, B . . . E, and numeral 1 designates an automatic guided vehicle (hereinafter referred to as "AGV"). The route is set up by fixedly laying the optical reflective tape R on the floor in a loop pattern so that a start point 0 is connected to objective points A, B . . . in order. It is noted in this connection that optical reflective tapes are not the only means available for setting up a route; other known materials such as magnetic tapes and the like may be suitably employed as well. Needless to say, formation of a route is not limited to a loop pattern; it may be of such formation as to connect the start point with the objective points in a linear pattern.

Station marks SMa, SMb . . . SMe, and SMo are also formed of an optical reflective tape, each having a length equal to or larger than the width of the AGV 1. They are fixedly set on the floor at the objective points A, B . . . and start point 0 respectively so that each of them, at the center of its length, intersects the route. It is noted that the station marks SMa . . . are individually placed over and across the route reflective tape R as the route so as to prevent the latter from peeling off. The AGV 1 travels from the start point 0 in the direction of the arrow along the route, thereafter stops selectively at the objective points A, B . . . , and returns to the start point 0, which process is repeated on a cyclic basis.

Figure 4:
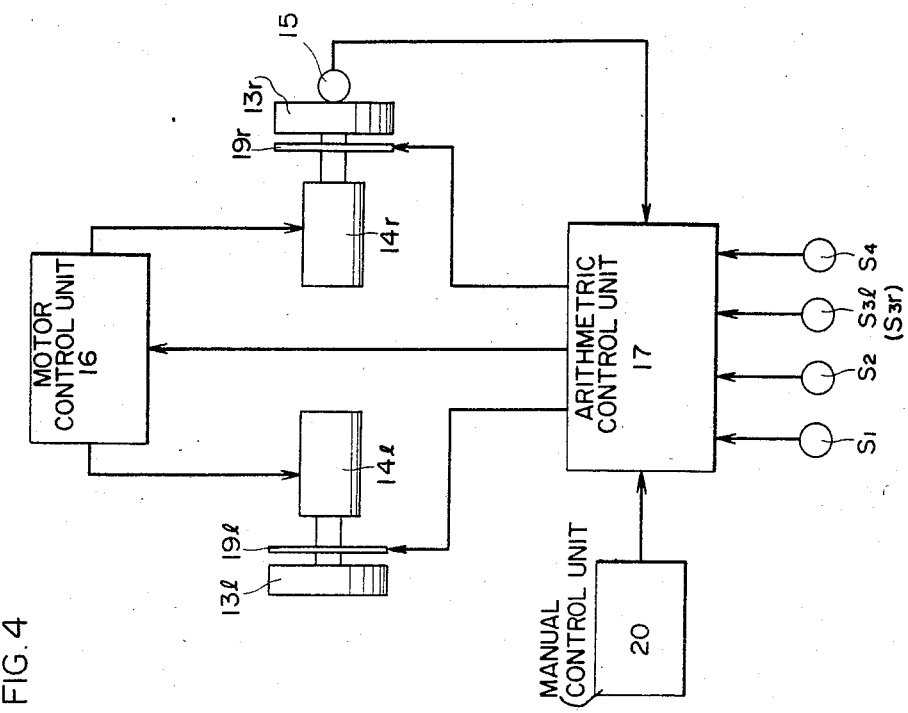
FIG. 4 is a block diagram showing a control system thereof.
Figure 3:
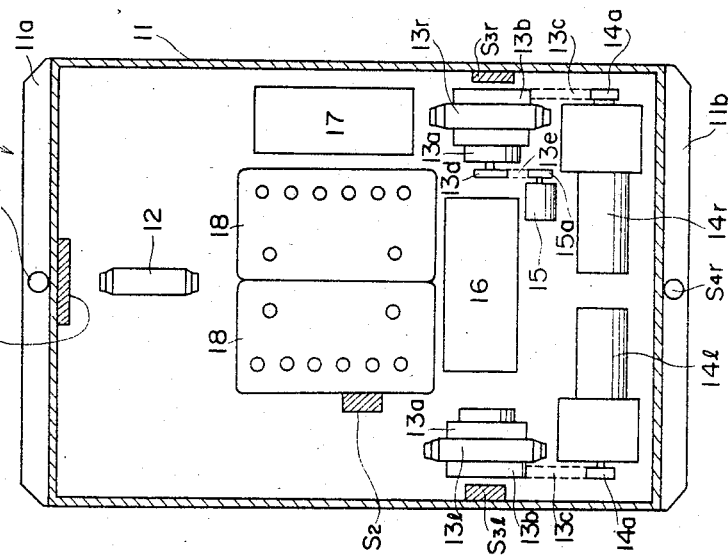
FIG. 3 is a schematic plan view illustrating the arrangement of an automatic guided vehicle employed in carrying out the method of the invention.

FIG. 3 is a schematic plan view illustrating the AGV 1, and FIG. 4 is a block diagram showing an apparatus of the invention. Shown by numeral 11 is a vehicle body, which carries a front wheel 12 and rear wheels 13l, 13r. The front wheel 12 is rotatably supported by a caster frame pivotally supported for rotation around a vertical shaft displaced centrally on the front bottom of the body 11. The rear wheels 13l, 13r are disposed on the rear portion of the bottom of the body 11 and adjacent both sides thereof, being supported by bearings 13a, 13a. Integrally with the rear wheels 13l, 13r and in coaxial relation therewith are there provided toothed pulleys 13b, 13b, which are individually connected through toothed belts 13c, 13c to toothed pulleys 14a, 14a provided on output shafts of motors 14l, 14r having reduction gears.

On the axle of the right rear wheel 13r there is mounted a toothed pulley 13d, which is connected to a toothed pulley 15a of a pulse generator 15 by a toothed belt 13e. The pulse generator 15 generates pulses proportional to the rotation speed of the right rear wheel 13 for transmission to the arithmetic control unit 17. Numeral 16 designates a control unit for the motors 14l, 14r; 17 designates an arithmetic control unit for the AGV 1; and 18 designates batteries.

On the underside of the body 11 and in front of the front wheel 12 there is disposed a steering sensor $S_1$ for tracing the optical reflective tape R as the route. Also on the underside of the body 11 are there provided the following sensors: sensor $S_2$ for detecting station marks SMa, SMb . . . and for deceleration control, which is disposed at a location intermediate between the front and rear ends; sensors $S_3l$, $S_3r$ for detecting station marks SMa, SMb . . . and for stopping the AGV 1, which are disposed close to the side edges of the body 11 and in opposed relation to the respective axile ends of the rear wheels 13l, 13r; and bumper sensors $S_4f$, $S_4r$ for stopping the AGV 1 upon its collision with an obstacle, which are respectively disposed at the front and rear ends of the body 11.

The steering sensor $S_1$ is comprised of optical element laterally aligned at a center location adjacent the front bottom end of the body 11 for detecting reflected light from the optical reflective tape R and is adapted to output a signal corresponding to the intensity of reflected light from the optical reflective tape R to the motor control unit 16 so as to make the unit 16 control the rotational speed of the motors 14l, 14r respectively for eliminating widthwise center deviations, if any, of the body 11 relative to the widthwise center of the optical reflective tape R.

The deceleration-control sensor $S_2$ is composed of optical elements as sensor $S_1$ is. When differential $\Delta MB$ between pulse N generated by the pulse generator 15 and a preset pulse number MB for the distance between start point 0 and objective point B, for example, reaches a value lower than a predetermined value $\epsilon$, that is, $\Delta MB < \epsilon$, the sensor $S_2$ goes into operation and subsequently, as it detects station mark $SM_1$ it outputs a detection signal to the arithmetic control unit 17. Upon entry of the signal from the sensor $S_2$, the arithmetic control unit 17 sends a signal to the control unit 16, which in turn outputs a deceleration control signal to the motors 14l, 14r for decelerating the AGV 1.

The sensors $S_3l$, $S_3r$, which are to detect an objective point for stopping control, goes into operation when pulse number N from the pulse generator 15 reaches a value within the specified range, and subsequently as they detect station mark SM, they output their detection signals to the arithmetic control unit 17. Upon entry of a signal from one of the sensors $S_3l$, $S_3r$, the arithmetic control unit 17 outputs a control signal to the control unit 16 for stopping the power supply to the both motors 14l, 14r and also it outputs control signals to the brakes 19l, 19r for braking control to stop the left and right rear wheels 13l, 13r.

It is noted that aforesaid predetermined value is a value set by considering possible steering control error, control-system responsibility, distance between sensor $S_2$ and sensors $S_3l$, $S_3r$ in the longitudinal direction of the body 11 (normally 200 mm or so), etc.; normally, it is set as a pulse number corresponding to a 1000 mm distance.

Figure 5:
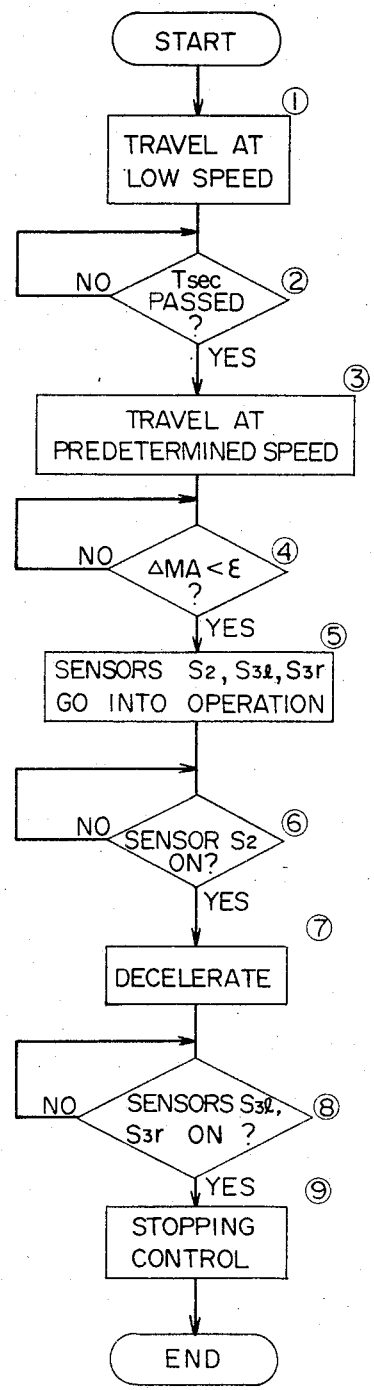
FIGS. 5, 6 and 7 are flow charts illustrating control procedure.

Nextly, the process of travel control by the above described arrangement will be explained with reference to the flow chart shown in FIG. 5.

Pulse numbers correspoding to individual distance between start point 0 and each objective point A, B, C . . . , and constant $\epsilon$ are first input into the arithmetic control unit 17 through a manual control unit 20. After the AGV 1 is placed at start point 0 on the route so as to be ready for travel toward the objective points, a mode changeover switch (not shown) on the manual control unit 20 is turned to auto-mode position and then a start button is operated, whereby both motors 14l, 14r for left and right rear wheels 13l, 13r start rotation at low speed and accordingly the AGV 1 starts travel at low speed (step ①). When the predetermined time (T sec) has passed after the start of travel (step ②), the arithmetic control unit 17 outputs a control signal to the control unit 16 for acceleration of the motors 14l, 14r, and accordingly the AGV 1 starts constant speed travel at a predetermined speed (step ③).

Whilst, after the start of AGV 1, pulses are generated by the pulse generator 15 according to the rotation speed of AGV 1's wheels, and accordingly a pulse number MA representing the distance between start point 0 and a first objective point A, which has been entered into a counter at the arithmetic control unit 17, begins to count down. Decision is made as to whether the difference between the preset pulse number MA and a pulse number N representing a distance actually covered by AGV 1, that is, the balance $\Delta MA$ of the preset pulse number MA being counted down from pulse number N, has become smaller than $\epsilon$ or not (step ④). When the balance has become smaller than $\epsilon$, the deceleration control sensor $S_2$ and stopping control sensors $S_3l$, $S_3r$ go into operation (step ⑤). Then, decision is made as to whether sensor $S_2$ has detected station mark SMa or not (step ⑥). If sensor $S_2$ has detected station mark SMa, the arithmetic control unit 17 outputs a control signal to the control unit 16 for deceleration of motors 14l, 14r (step ⑦). It is then determined whether or not either sensor $S_3l$ or sensor $S_3r$ has detected the station mark SMa as already detected by sensor $S_2$ (step ⑧). If "YES", the arithmetic control unit 17 outputs a control signal to the control unit 16 for switching off power supply to the both motors 14l, 14r and simultaneously it outputs a control signal to the brakes 19l, 19r for braking operation to stop the AGV 1 (step ⑨). Control of AGV 1's travel to subsequent objective points B, C . . . is carried out in similar manner.

Figure 7:
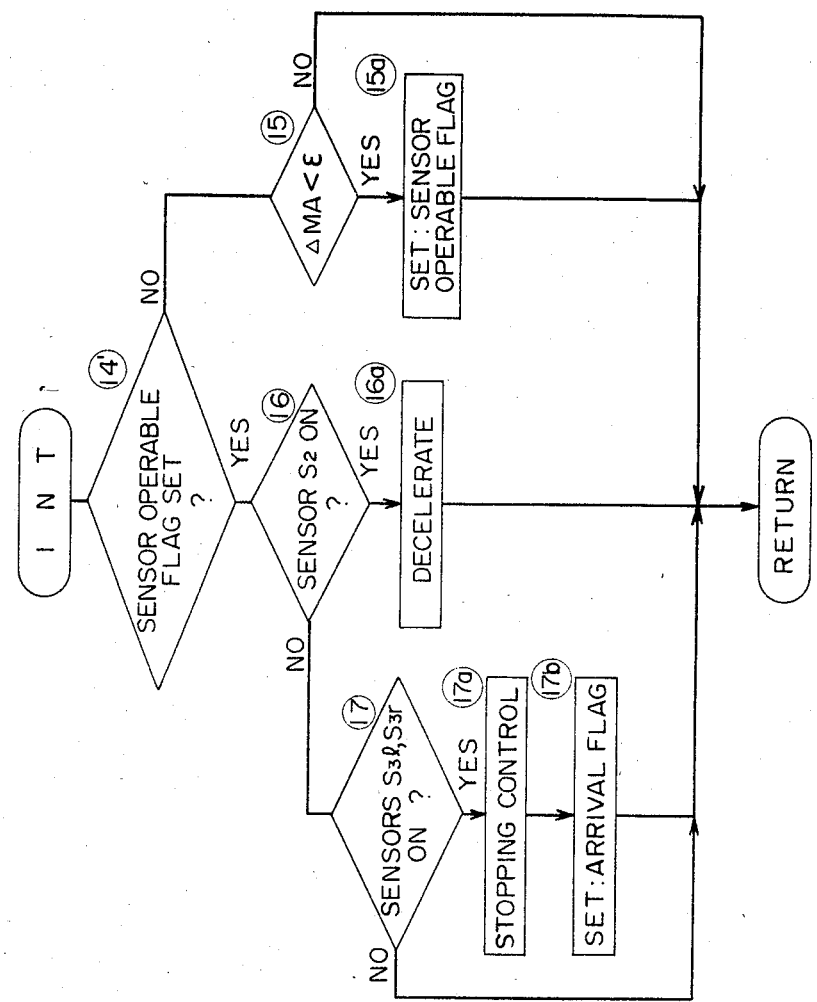
Figure 6:
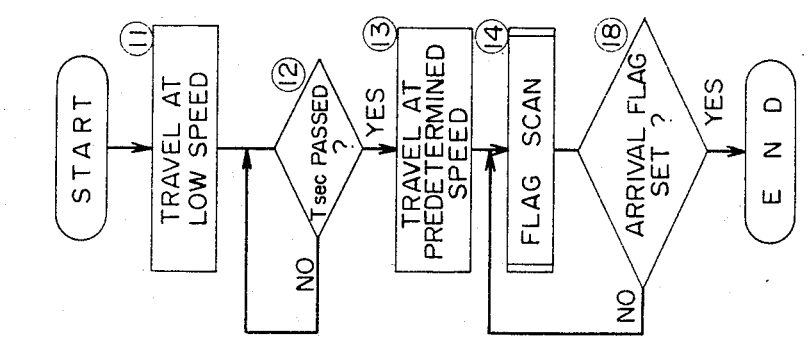

FIGS. 6 and 7 present flow charts showing another form of practicing the method of the invention. Data, such as pulse numbers MA, MB . . . corresponding to individual distances between start point 0 and each objective point A, B, C . . . , and constant $\epsilon$, are first input into the arithmetic control unit 17, and the AGV 1 is caused to start travel (step ⑪). After a predetermined time T sec has passed (step ⑫), the AGV 1 is accelerated for constant speed travel at a predetermined speed (step (13)). It is noted that as the AGV 1 starts travel, the pulse generator 15 generates pulses corresponding to the rotation speed of the vehicle disposed on the AGV 1, and accordingly a relevant pulse number entered in a counter at the arithmetic control unit 17 begins to be counted down. The process of control up to this stage is same as that shown in FIG. 5. Subsequently, flag scanning is carried out (step (14)), whereby interruption is made at a predetermined timing for subroutine as illustrated in FIG. 7. Returning to the main routine in FIG. 6 thereafter, decision is made as to whether an arrival flag (which is set when sensors $S_3l$, $S_3r$ are on) has been set or not (step (18)). Then, returning to step (14), flag scanning is made. This process is repeated.

In the subroutine shown in FIG. 7, decision is made as to whether a sensor operable flag has been set or not (step (14')). If "NO", decision is made as to the balance of pulse number $\Delta MA$ up to the objective point A is lower than $\epsilon$ or not (step (15)). If "YES", whether sensor $S_2$ is ON or not (step (16)).

At step (15), if the result of decision is "YES", a flag is set indicating that the deceleration control sensor $S_2$ is operable (step (15a)). If "NO", then processing returns to the main routine. At step (16), if the sensor $S_2$ is ON, deceleration control is made (step (16a)). If "NO", decision is made as to whether the stopping control sensors $S_3l$, $S_3r$ are ON or not (step (17)). If "NO", then processing returns to main routine. If "YES", stopping control is made (step (17a)) and an arrival flag is set (step (17b)). Then, processing returns to step (18) of main routine, decision is made as to whether an arrival flag has been set or not. If "NO", above described processing of subroutine is repeated. If "YES", the AGV 1 is stopped, thus the process of control being completed.

As above described, in the process of flag scanning in the main routine, interruption of subroutine is made for scanning of step (15), (16) and (17), and therefore, when the balance of the pulse number up to the objective point becomes lower than $\epsilon$, or in other words, when the distance between the AGV 1 and the objective point reaches within a prescribed value range, inasmuch as a sensor operable flag has been set, the AGV 1 can be accurately stopped at the objective point, if sensor $S_3l$, $S_3r$ are ON, even though $S_2$ is not ON by some reason.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A method for controlling travel of an automatic guided vehicle to make said automatic guided vehicle travel along a route from a start point to an objective point and stop at said objective point, comprising the steps of;
   detecting a distance of said travel from said start point of said automatic guided vehicle toward said objective point;
   comparing said detected distance with a predetermined distance, said predetermined distance being shorter than the distance between said start point and said objective point;
   detecting by at least one sensor a mark located at said objective point; stopping said automatic guided vehicle when said mark is detected on and after the occurrence of said comparing result.

2. An apparatus for controlling travel of an automatic guided vehicle to make said vehicle travel along a route from a start point to an objective point and stop at said objective point, comprising;
   covered distance detecting means for detecting a distance covered by said automatic guided vehicle;
   comparator means for comparing said distance detected by said distance detecting mean with a prescribed distance shorter than a distance between said start point and said objective point; and
   at least one sensor for detecting a mark located at said objective point;
   wherein on and after the occurrence of a comparing result of said comparator, said automatic guided vehicle is caused to stop when said mark is detected by said at least one sensor.

3. An apparatus for controlling travel of an automatic guided vehicle as set forth in claim 2, having a first one of said sensors disposed on a front side of said automatic guided vehicle and on the center portion thereof, and second and third ones of said sensors disposed on a rear side of said automatic guided vehicle and on each side thereof.

4. An apparatus for controlling travel of an automatic guided vehicle as set forth in claim 3, wherein said first sensor disposed on said front side of said automatic guided vehicle is a sensor for providing a signal for causing deceleration of said automatic guided vehicle, and said first and second sensors are sensors for providing a signal for causing stopping of said automatic guided vehicle.

* * * * *